United States Patent
Ishida et al.

(10) Patent No.: US 9,290,230 B2
(45) Date of Patent: Mar. 22, 2016

(54) SADDLE-RIDE TYPE VEHICLE

(71) Applicant: HONDA MOTOR CO., LTD., Tokyo (JP)

(72) Inventors: Shinichiro Ishida, Wako (JP); Yoshiyuki Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/259,678

(22) Filed: Apr. 23, 2014

(65) Prior Publication Data
US 2014/0361512 A1    Dec. 11, 2014

(30) Foreign Application Priority Data
Jun. 6, 2013    (JP) ................. 2013-119941

(51) Int. Cl.
| | |
|---|---|
| B62K 25/00 | (2006.01) |
| B62K 25/20 | (2006.01) |
| B62K 25/28 | (2006.01) |
| B62K 11/04 | (2006.01) |
| B62K 19/30 | (2006.01) |

(52) U.S. Cl.
CPC ............... B62K 25/20 (2013.01); B62K 11/04 (2013.01); B62K 19/30 (2013.01); B62K 25/283 (2013.01); B62K 25/286 (2013.01)

(58) Field of Classification Search
CPC ..... B62K 25/28; B62K 25/283; B62K 25/286
USPC ............................................. 180/227; 28/284
See application file for complete search history.

(56) References Cited

U.S. PATENT DOCUMENTS

| | | | |
|---|---|---|---|
| 4,159,756 A | 7/1979 | Murakami et al. | |
| 6,290,017 B1 * | 9/2001 | Ito | 180/227 |
| 7,178,620 B2 * | 2/2007 | Toyoda | 180/227 |
| 7,644,795 B2 * | 1/2010 | Kawamura et al. | 180/219 |
| 7,963,359 B2 * | 6/2011 | Fujita | 180/227 |
| 8,839,896 B2 * | 9/2014 | Oshima et al. | 180/69.4 |
| 8,955,633 B2 * | 2/2015 | Nakamura et al. | 180/227 |
| 2004/0239071 A1 * | 12/2004 | Chamberlain et al. | 280/284 |
| 2007/0108725 A1 * | 5/2007 | Graney | 280/284 |

FOREIGN PATENT DOCUMENTS

| | | |
|---|---|---|
| JP | 07-084190 B | 9/1995 |
| JP | 2010-215218 A | 9/2010 |

* cited by examiner

*Primary Examiner* — Anne Marie Boehler
*Assistant Examiner* — Marlon Arce
(74) *Attorney, Agent, or Firm* — Squire Patton Boggs (US) LLP (57) ABSTRACT

A saddle-ride type vehicle may include a rear cushion that extends upward while one end thereof in a longitudinal direction is connected to a swing arm and that elongates and contracts in the longitudinal direction according to swinging of the swing arm to generate damping force with respect to the swinging of the swing arm, and a rear cushion supporting portion that is provided to a center upper cross frame provided in an upper portion of a vehicle and that supports the other end of the rear cushion in the longitudinal direction. The center upper cross frame is positioned on an extension line of the rear cushion in the longitudinal direction, an opening that penetrates through a horizontal direction is formed in a pivot plates, and in a side view, a rear cushion supporting portion is positioned inside of the opening.

12 Claims, 9 Drawing Sheets

SADDLE-RIDE TYPE VEHICLE

BACKGROUND

1. Field

Certain embodiments of the present invention relate to a saddle-ride type vehicle.

2. Description of the Related Art

The existing saddle-ride type vehicle has been known in JP-A No. 2010-215218 (Patent Literature 1). The existing saddle-ride type vehicle is configured such that in the saddle-ride type vehicle including a rear cushion that elongates and contracts along a longitudinal direction and that generates damping force with respect to swinging of a swing arm, the rear cushion is arranged while the longitudinal direction thereof is arranged along a vertical direction (arranged upward from behind, or the like), a cross frame that connects a pair of right and left frames is positioned on an extension line of the rear cushion in the longitudinal direction of the rear cushion (hereinafter called, on the extension line of the rear cushion in the longitudinal direction), and an upper end of the rear cushion is connected to the cross frame.

As a structure according to the Patent Literature 1, in case that the cross frame is positioned on the extension line of the rear cushion in the longitudinal direction, when a load is input from the rear cushion into the cross frame, the load is linearly input into the cross frame. Thereby, a torsional load is less likely to occur in the cross frame. For this reason, an ideal layout of the rear cushion is achieved.

The structure according to Patent Literature 1 is capable of ideally receiving a load transmitted from the rear cushion. On the other hand, in consideration of a need to ensure a relief portion for a tool with respect to a rear cushion bracket (hereinafter called a rear cushion supporting portion) formed with respect to the cross frame in order to fasten an upper end of the rear cushion and the cross frame, the rear cushion supporting portion and a pair of right and left frames (pivot plates) to which the cross frame is connected are displaced from each other in a side view so as not to overlap with each other.

However, as described above, in the structure such that the rear cushion supporting portion and the pivot plates are displaced from each other in the side view, it may be conceivable that the pivot plates are formed in a large way, and securement of a desired strength and rigidity of the pivot plates is difficult.

Also, when the rear cushion supporting portion is extended after the pivot plates are made larger, the torsional load is easily generated in the cross frame. Therefore, the degree of freedom in layout for ideally receiving the load from the rear cushion supporting portion by the cross frame is low. Here, if the load cannot be ideally received by the cross frame, in response to the strength and rigidity, the number of components is increased, and also pending issues such as an increase in weight due to the increase of the number of components arise.

SUMMARY

Therefore, an object of certain embodiments of the present invention is to provide a saddle-ride type vehicle configured such that while a load transmitted from a rear cushion is ideally received by a cross frame, a relief portion for a tool for operation of a rear cushion supporting portion can be ensured, and further, rigidity of a frame to which the cross frame is connected is easily ensured.

In order to address the above-described problem, according to certain embodiments, there is provided a saddle-ride type vehicle including a main frame (extending rearward and downward from a head pipe. The saddle-ride type vehicle also includes pair of left and right pivot plates, each of the pivot plates being connected to a rear end of the main frame, or being arranged on a side of the rear end of the main frame. The saddle-ride type vehicle further includes a cross frame that is arranged to straddle the left and right pivot plates, or that is connected to the rear end of the main frame and extends in a horizontal direction. The saddle-ride type vehicle also includes a swing arm that is swingably supported by the pivot plates. The saddle-ride type vehicle further includes a rear cushion that extends upward while one end thereof, in a longitudinal direction, is connected to the swing arm and that elongates and contracts in the longitudinal direction according to swinging of the swing arm to generate damping force with respect to the swinging of the swing arm. The saddle-ride type vehicle also includes a rear cushion supporting portion that is provided to the cross frame and that supports the other end of the rear cushion in the longitudinal direction. The cross frame is positioned on an extension line of the rear cushion in the longitudinal direction, an opening that penetrates through a horizontal direction is formed in at least one of the left and right pivot plates, and in a side view, the rear cushion supporting portion is positioned inside of the opening.

According to other embodiments, in the side view, the cross frame completely overlaps with at least any of the main frame and the pivot plates, and the rear cushion supporting portion has a pair of left and right wall portions that extend downward from the cross frame, and supports the other end of the rear cushion in the longitudinal direction in such a manner that the other end is received from below between the left and right wall portions.

According to other embodiments, the saddle-ride type vehicle further includes a pair of left and right seat frames that are arranged on respective upper sides of the left and right pivot plates, and that extend rearward and upward. The saddle-ride type vehicle also includes a pair of left and right sub-frames that are respectively connected to the left and right pivot plates below the left and right seat frames, that extend rearward and upward, and that have rear ends connected to the corresponding left and right seat frames. In the side view, a reservoir tank for the rear cushion is positioned rearward of the pivot plates and between the seat frames and the sub-frames.

According to other embodiments, in the side view, the main frame, the seat frames and the pivot plates form a Y shape. The opening is formed in substantially the center in the longitudinal direction of a connection portion of the Y shape and above a pivot shaft that connects the swing arm and the pivot plates.

According to other embodiments, the one end of the rear cushion in the longitudinal direction is connected to the swing arm through a link member, and the link member is arranged to straddle the swing arm and a portion below a position where the pivot shaft is placed. The pivot shaft is provided with respect to the pivot plates to connect the pivot plates and the swing arm.

According to other embodiments, an engine is disposed forward of the rear cushion supporting portion. The engine is supported by an engine supporting portion provided to each of the pivot plates, and the rear cushion supporting portion is positioned substantially at the same height as the engine supporting portion.

With certain embodiments, since the cross frame is positioned on the extension line of the rear cushion in the longitudinal direction, a load transmitted from the rear cushion can be ideally received by the cross frame. Also, a relief portion for a tool for operation with respect to the rear cushion supporting portion can be ensured by the opening formed in the pivot plate. Further, in order to ensure the relief portion for the tool, it is not necessary to displace or the like the rear cushion supporting portion from the pivot plates. Thereby, an area for the pivot plates can be easily ensured, and rigidity of the pivot plates can be easily ensured.

With other embodiments, since in the side view, the cross frame is completely hidden by at least any of the main frame and the pivot plates, appearance quality can be improved. Also, the rear cushion supporting portion has the pair of right and left wall portions, and supports the other end of the rear cushion in the longitudinal direction by receiving the other end from below between these wall portions. Thereby, the rear cushion can be preferably swung in the longitudinal direction and in the vertical direction with the horizontal direction as the shaft center.

With other embodiments, since in the side view, the reservoir tank is disposed in the position not to be hidden by a frame member, adjustment work or the like with respect to the reservoir tank can be easily performed. Also, since air or wind is easily led to flow from the opening in the pivot plate or a portion between the seat frame and the sub-frame toward the reservoir tank, the reservoir tank can be preferably cooled.

With other embodiments, since in the pivot plate, the opening is formed in a part with no load comparatively applied, a reduction in the rigidity of the pivot plates due to formation of the opening can be suppressed.

With other embodiments, since the link member is arranged at a comparatively low position, length of the rear cushion can be ensured and a damping effect can be improved.

With other embodiments, complicated application of the load on the pivot plates can be suppressed.

DETAILED DESCRIPTION

Hereinafter, certain embodiments of the present invention will be described using the attached drawings. In the drawings used for the following explanation, an arrow FR is indicative of the front of a vehicle, an arrow UP is indicative of an upper side of the vehicle, and an arrow LH is indicative of a left side of the vehicle.

Figure 1:
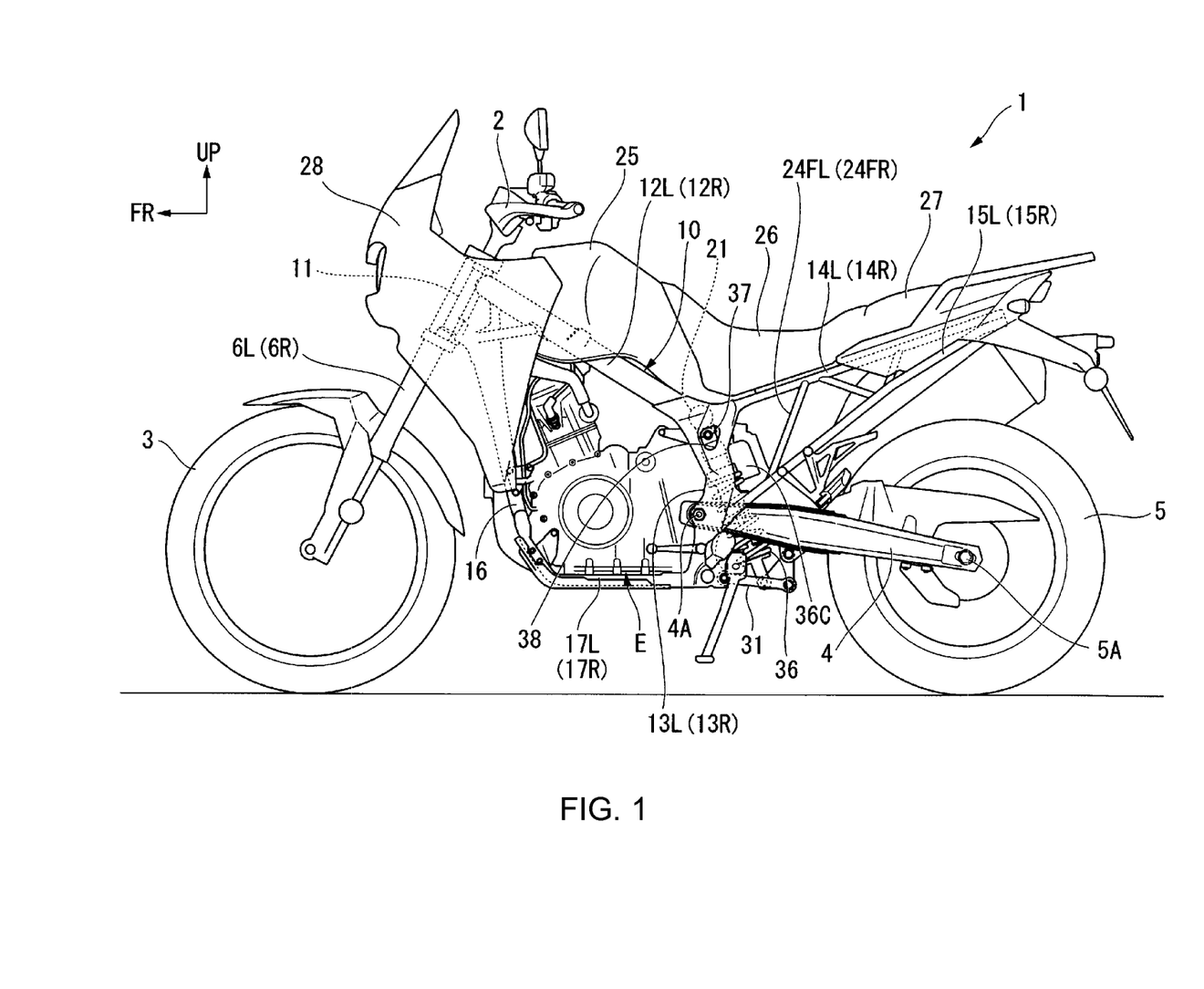
FIG. 1 is a left side view of a motorcycle according to an embodiment of the present invention.

FIG. 1 shows a left side view of a motorcycle 1 as a saddle-ride type vehicle according to certain embodiments. In the motorcycle 1, an engine E is disposed between a front wheel 3 steered by a steering handlebar 2 and a rear wheel 5 arranged at a rear end of a swing arm 4. Steering components including the steering handlebar 2 and the front wheel 3 are steerably pivotally supported by a head pipe 11 at a front end of a vehicle body frame 10. A front end of the swing arm 4 is swingably supported on the vehicle body frame 10, and a rear end of the vehicle body frame 10 supports an axle 5A of the rear wheel 5.

Figure 2:
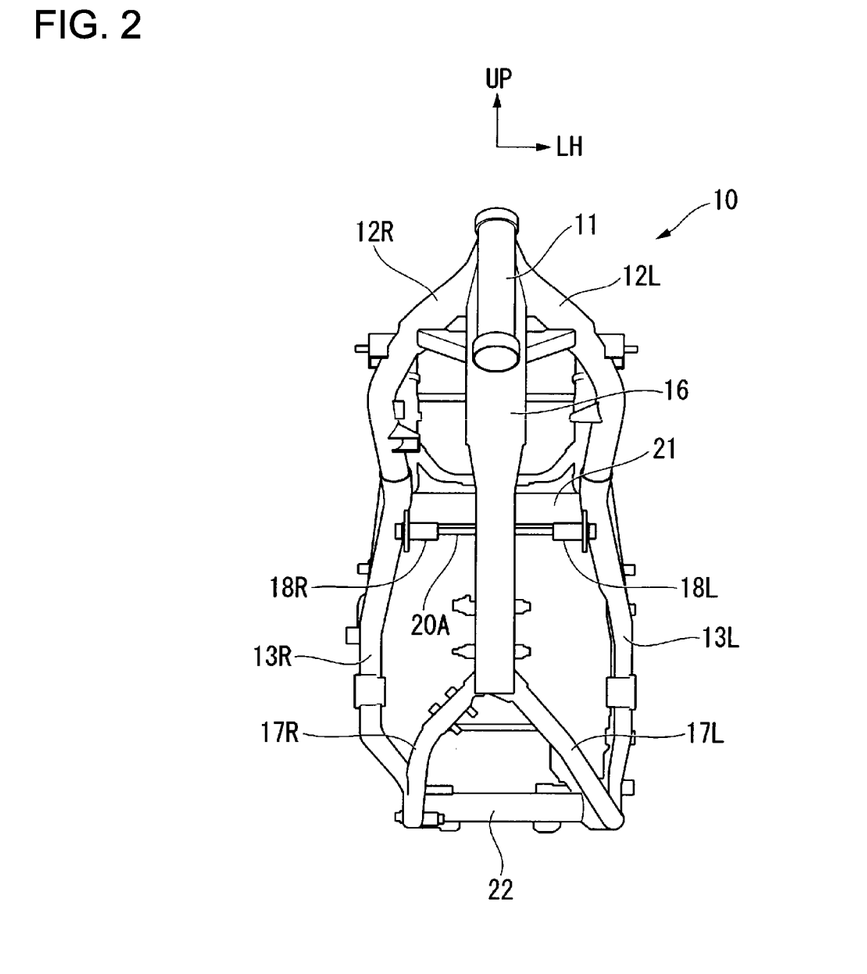
FIG. 2 is a front view of a vehicle body frame of the motorcycle.
Figure 3:
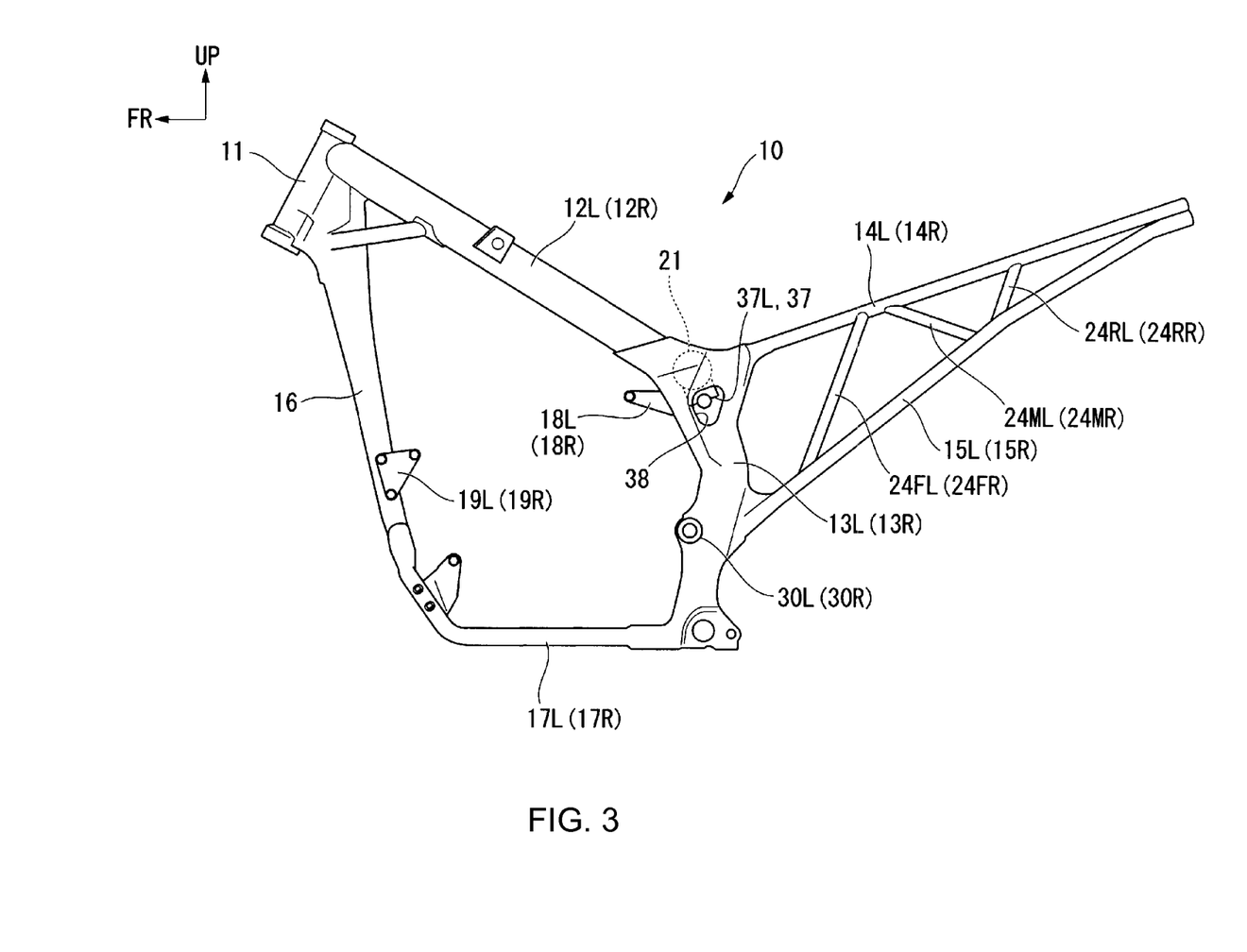
FIG. 3 is a left side view of the vehicle body frame of the motorcycle.
Figure 4:
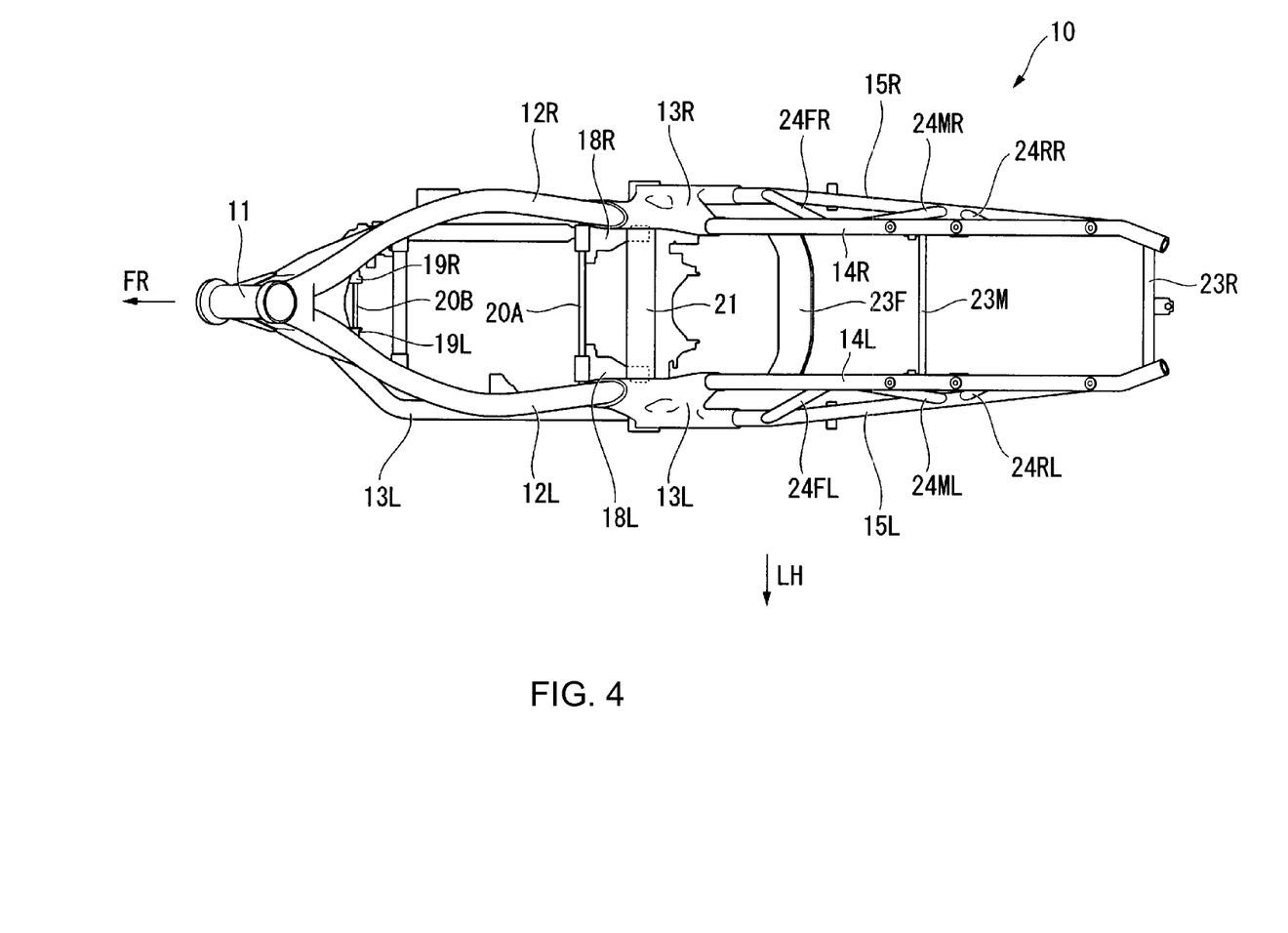
FIG. 4 is a top view of the vehicle body frame of the motorcycle.

With reference to FIGS. 2 to 4, the vehicle body frame 10 is composed by integrating a plurality of frame members by welding or the like. The vehicle body frame 10 includes the head pipe 11. The vehicle body frame 10 also includes a pair of left and right main frames 12L, 12R that are branched to left and right from the head pipe 11 and that extend rearward and downward. The vehicle body frame 10 further includes a pair of left and right pivot plates 13L, 13R that are connected to respective rear ends of the left and right main frames 12L, 12R and that extend downward. The vehicle body frame 10 also includes a pair of seat frames 14L, 14R that are connected to respective upper portions of the left and right pivot plates 13L, 13R and that extend rearward and upward. The vehicle body frame 10 further includes a pair of left and right sub-frames 15L, 15R that are connected to the respective left and right pivot plates 13L, 13R below the left and right seat frames 14L, 14R, that extend rearward and upward, and that have rear ends connected to the corresponding left and right seat frames 14L, 14R.

Also, the vehicle body frame 10 includes one down frame 16 that extends rearward and downward from the head pipe 11 at a steeper angle than the main frames 12L, 12R. The vehicle body frame 10 also includes a pair of left and right rear frames 17L, 17R that are branched to left and right from a lower end of the down frame 16, that extend rearward, and that have rear ends connected to lower ends of the corresponding left and right pivot plates 13L, 13R. In the vehicle body frame 10, in the side view, the main frames 12L, 12R, the seat frames 14L, 14R, and the pivot plates 13L, 13R are connected to each other to form a Y shape. In the drawings, as to unillustrated members, reference signs thereof may be parenthesized for the sake of convenience of the explanation.

With reference to FIG. 1, the vehicle body frame 10 is formed as a semi-double cradle vehicle body frame configured in such a manner that the engine E is disposed below the main frames 12L, 12R, and also the engine E is surrounded from the front side and from below by the down frame 16 and the rear frames 17L, 17R.

With reference to FIGS. 3 and 4, the left and right pivot plates 13L, 13R are provided with a pair of left and right rear engine supporting portions 18L, 18R that project forward, a lower end of the down frame 16 is provided with a pair of left and right front engine supporting portions 19L, 19R that project rearward, and the engine E is supported by the respective engine supporting portions.

With reference to FIG. 4, a shaft member 20A is arranged to straddle the left and right rear engine supporting portions 18L, 18R, and a rear portion of the engine E is supported by the shaft member 20A. Also, a shaft member 20B is arranged to straddle the left and right front engine supporting portions 19L, 19R, and a front portion of the engine E is supported by the shaft member 20B.

The left main frame 12L, the left pivot plate 13L, the left seat frame 14L, the left sub-frame 15L, and the left rear frame 17L of the pair of left and right main frames 12L, 12R, the pair of left and right pivot plates 13L, 13R, the pair of left and right seat frames 14L, 14R, the pair of left and right sub-frames 15L, 15R, and the pair of left and right rear frames 17L, 17R are respectively arranged on a left side with respect to the center in a vehicle width direction. The right main frame 12R, the right pivot plate 13R, the right seat frame 14R, the right sub-frame 15R, and the right rear frame 17R of the pair of left and right main frames 12L, 12R, the pair of left and right pivot plates 13L, 13R, the pair of left and right seat frames 14L, 14R, the pair of left and right sub-frames 15L, 15R, and the pair of left and right rear frames 17L, 17R are respectively arranged on a right side with respect to the center in the vehicle width direction. The right and left sides of the respective frames configured as the pair of right and left frames are joined to each other through the cross frame in a right place.

Specifically, a center upper cross frame 21 is arranged to straddle upper portions of the left and right pivot plates 13L, 13R, and a center lower cross frame 22 is arranged to straddle lower portions of the left and right pivot plates 13L, 13R.

Respective left and right ends of the center upper cross frame 21 and the center lower cross frame 22 are welded to inner surfaces of the left and right pivot plates 13L, 13R, the inner surfaces being directed to an inner side in the vehicle width direction. The left and right pivot plates 13L, 13R are formed to have a wide plate-like shape in the longitudinal direction. In the embodiment, in both a right side view and a left side view, the center upper cross frame 21 and the center lower cross frame 22 are positioned inside of the left and right pivot plates 13L, 13R in the vehicle width direction and completely overlap with the left and right pivot plates 13L, 13R. Therefore, the center upper cross frame 21 and the center lower cross frame 22 are invisible in the side view.

As the cross frame, a front seat cross frame 23F, an intermediate seat cross frame 23M, and a rear seat cross frame 23R are arranged to straddle the left and right seat frames 14L, 14R. The intermediate seat cross frame 23M is arranged between substantially the centers of the seat frames 14L, 14R in the longitudinal direction, the rear seat cross frame 23R is arranged between rear ends of the seat frames 14L, 14R, and the front seat cross frame 23F is arranged between the intermediate seat cross frame 23M and the center upper cross frame 21 in the longitudinal direction.

A pair of left and right front truss frames 24FL, 24FR, a pair of left and right intermediate truss frames 24ML, 24MR, and a pair of left and right rear truss frames 24RL, 24RR, that extend in the vertical direction and that connect the left and right seat frames 14L, 14R and the left and right sub-frames 15L, 15R, are provided between the left and right seat frames 14L, 14R and the left and right sub-frames 15L, 15R.

The front truss frames 24FL, 24FR respectively extend downward and backward from the front portions of the left and right sub-frames 15L, 15R, and are connected to the corresponding left and right seat frames 14L, 14R.

The intermediate truss frames 24ML, 24MR extend downward and backward from a rear side of a position with the front truss frames 24FL, 24FR connected to the seat frames 14L, 14R, and are connected to the corresponding left and right sub-frames 15L, 15R. Also, the rear truss frames 24RL, 24RR extend upward and backward from a rear side of a position with the intermediate truss frames 24ML, 24MR connected to the sub-frames 15L, 15R, and are connected to the corresponding left and right seat frames 14L, 14R.

Returning to FIG. 1, the steering components supported by the head pipe 11 include the front wheel 3. The steering components supported by the head pipe 11 also includes a pair of left and right front forks 6L, 6R that support the front wheel 3 by lower portions thereof. The steering components supported by the head pipe 11 further includes a steering shaft (omitted from the drawing) that is connected to upper portions of the front forks 6L, 6R, that is inserted into the head pipe 11, and that is rotatably supported. The steering components supported by the head pipe 11 also include the steering handlebar 2 that is arranged on an upper side of the steering shaft.

The swing arm 4 is connected to the pivot plates 13L, 13R by a pivot shaft 4A provided in substantially the center of the vertical direction between the pair of left and right pivot plates 13L, 13R of the vehicle body frame 10. The pivot shaft 4A is arranged to straddle the pair of left and right pivot plates 13L, 13R, and the swing arm 4 is swingable in the vertical direction with the horizontal direction as the shaft center.

Also, a fuel tank 25 is supported on the main frames 12L, 12R, an occupant seat 26 is supported on front upper portions of the seat frames 14L, 14R behind the fuel tank 25, and a pillion passenger seat 27 is supported on rear upper portions of the seat frames 14L, 14R. A front cover 28 that extends over the front side and right and left sides of the head pipe 11 and that covers the head pipe 11 from the front side and the right and left sides is provided around the head pipe 11.

Figure 5:
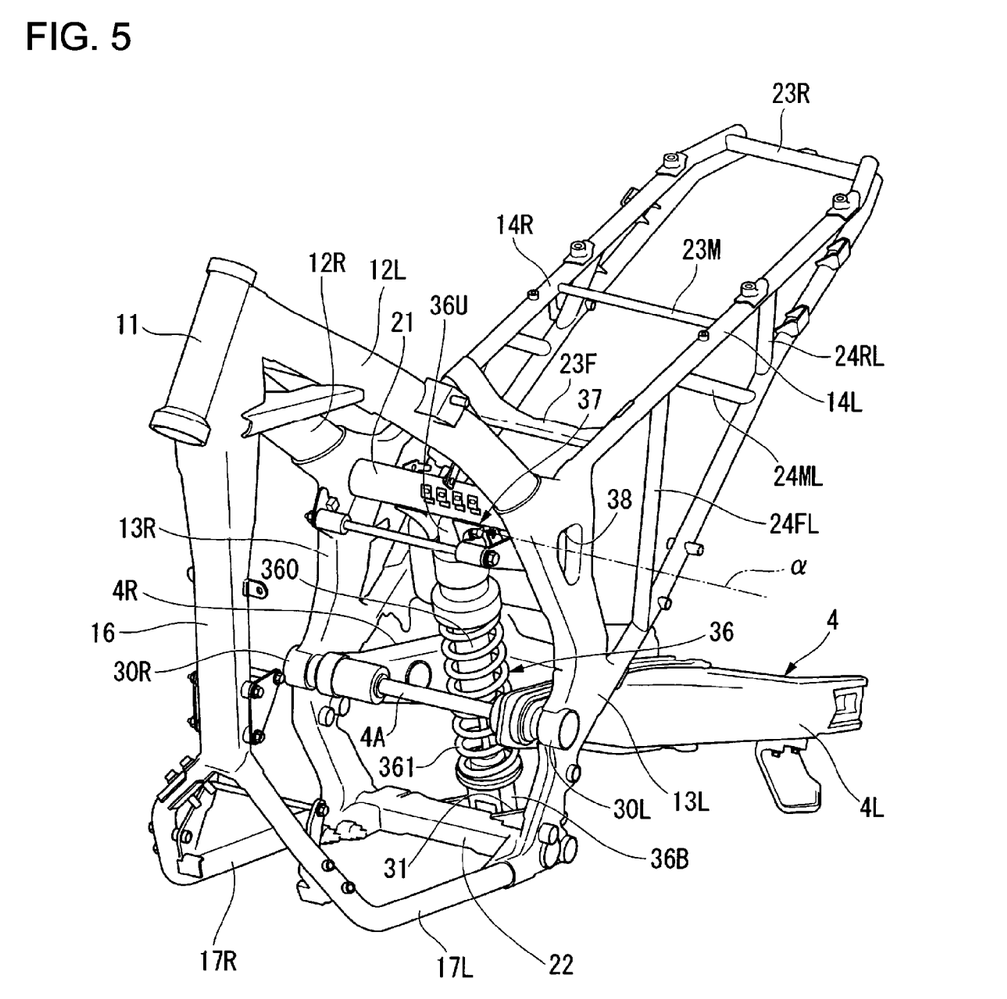
FIG. 5 is a perspective view with the vehicle body frame and a swing arm connected to each other.
Figure 6:
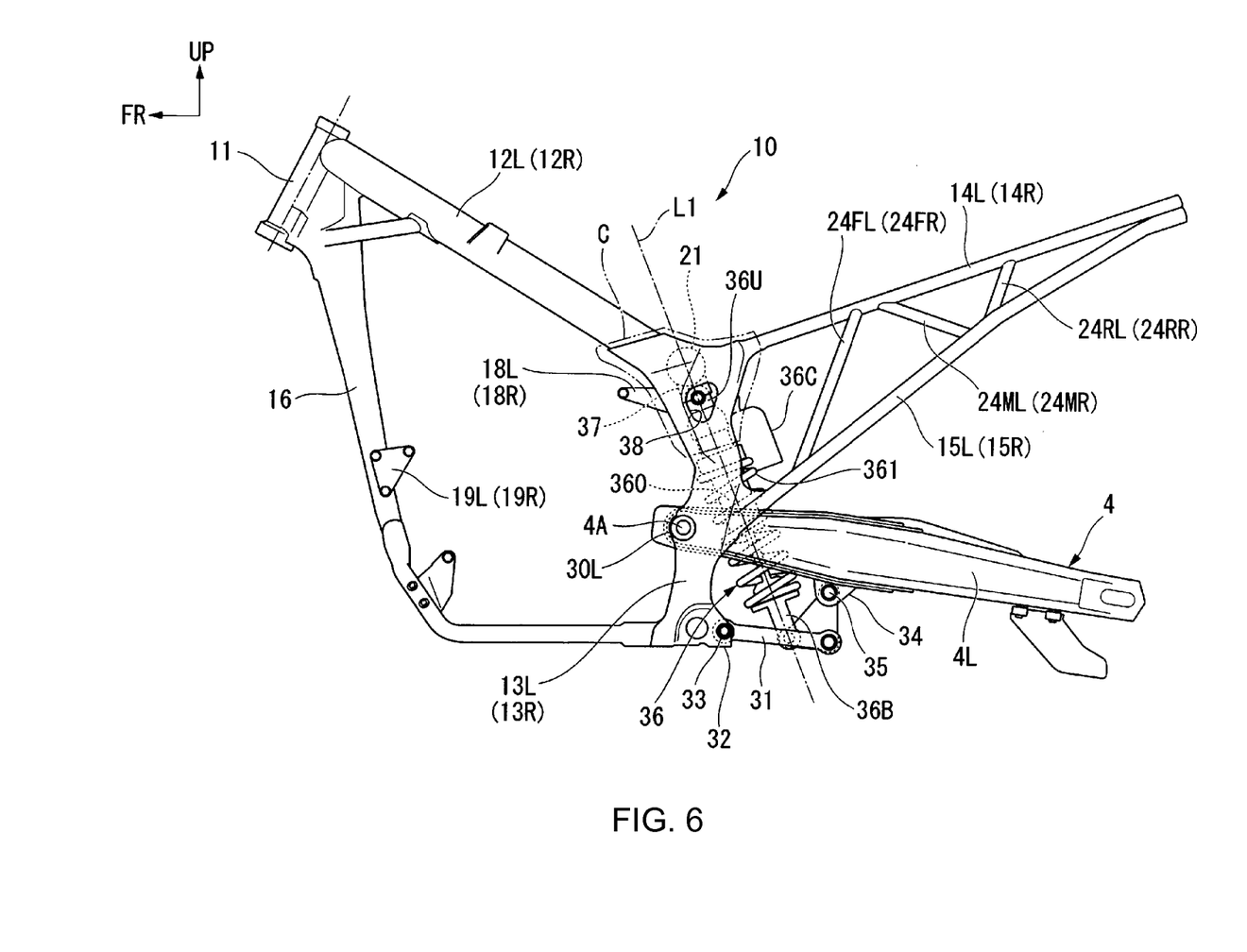
FIG. 6 is a left side view with the vehicle body frame and the swing arm connected to each other.
Figure 7:
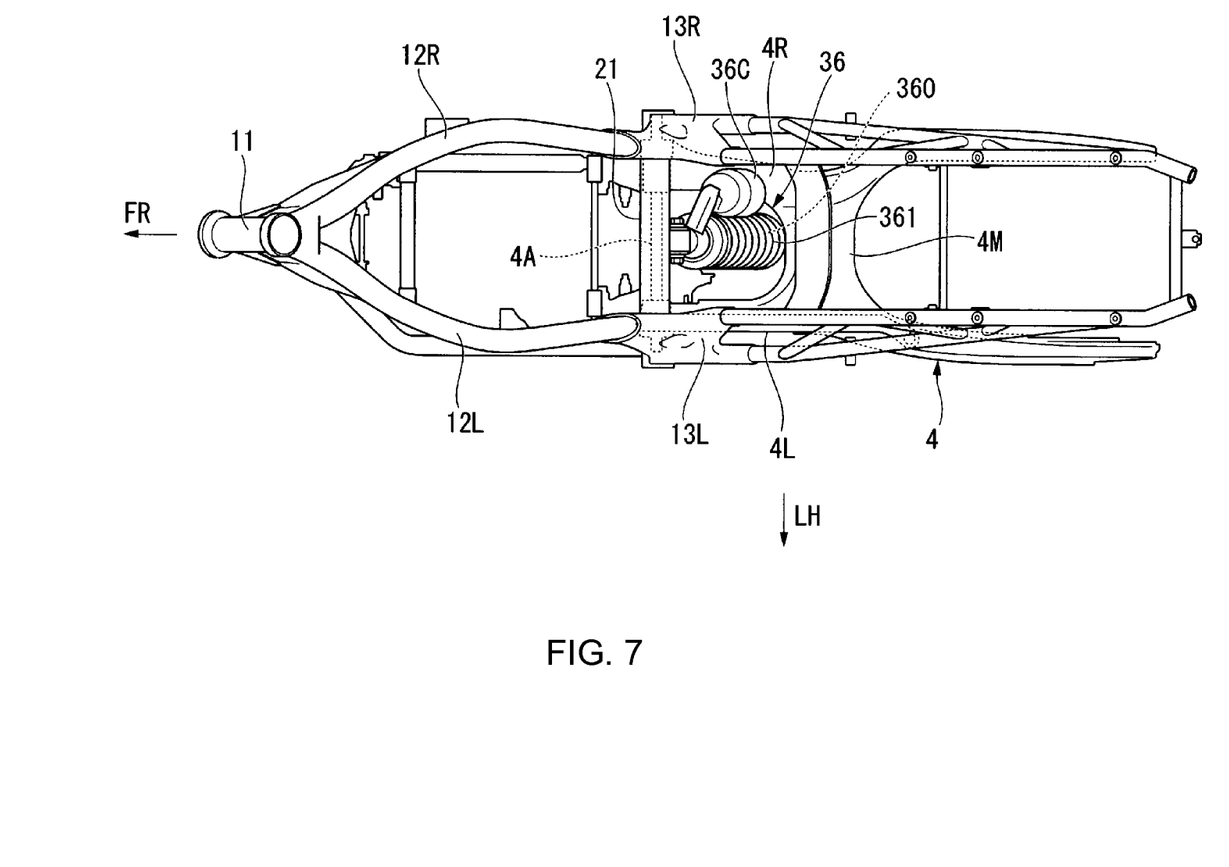
FIG. 7 is a top view with the vehicle body frame and the swing arm connected to each other.

With reference to FIGS. 5 to 7, these drawings show such a state that the swing arm 4 is connected to the pivot plates 13L, 13R. As shown in FIG. 5, at front edges of portions in substantially the centers in the vertical direction of the left and right pivot plates 13L, 13R, right and left cylindrical bosses 30L, 30R formed with holes penetrating through the horizontal direction are formed integrally with the pivot plates 13L, 13R by welding. The pivot shaft 4A is arranged to straddle the left and right bosses 30L, 30R while being inserted into a front end of the swing arm 4. Thereby, the swing arm 4 is connected to the pivot plates 13L, 13R.

With reference to FIGS. 6 and 7, the swing arm 4 according to certain embodiments include a pair of left and right arm portions 4L, 4R, and a connection 4M that connects the arm portions 4L, 4R at substantially the center parts in the longitudinal direction of the arm portions 4L, 4R. Front ends of the arm portions 4L, 4R are respectively formed with insertion holes (omitted from the drawings) into which the pivot shaft 4A is relatively rotatably inserted.

Also, in certain embodiments, the link member 31 is arranged to straddle the pivot plates 13L, 13R and the swing arm 4. With reference to FIG. 6, the link member 31 has a front end that is supported through a shaft portion 33 by a front link supporting portion 32 provided at the lower end of each of the left and right pivot plates 13L, 13R, and a rear end supported through a shaft portion 35 by a rear link supporting portion 34 projecting downward from the connection 4M for the swing arm 4. The front end of the link member 31 is swingable with the shaft portion 33 extending in the horizontal direction as the shaft center, and also the rear end of the link member 31 is swingable with the shaft portion 35 extending in the horizontal direction as the shaft center.

In certain embodiments, the rear cushion 36 formed of a substantially cylindrical outside shape and extending long in an axial direction L1 thereof is arranged to straddle the link member 31 and the center upper cross frame 21. The rear cushion 36 elongates and contracts in the longitudinal direction as the axial direction L1, thereby generating the damping force with respect to the swinging of the swing arm 4. The rear cushion 36 includes a cylinder portion 360 having a damper chamber, a spring 361 arranged on a periphery of the cylinder portion 360, a rod portion 36B projecting along the axial direction L1 from the cylinder portion 360, and a reservoir tank 36C projecting in a radially outward direction from an upper portion of the cylinder portion 360 and communicating with the inside of the cylinder portion 360.

The rear cushion 36 extends upward (specifically, forwardly upward) while a tip end (lower end) of the rod portion 36B is connected to the link member 31, and an upper end connection 36U provided at an upper end of the cylinder portion 36O is connected to the rear cushion supporting portion 37 provided to the center upper cross frame 21.

In certain embodiments, as can be seen in FIG. 6, the center upper cross frame 21 is positioned on the extension line of the rear cushion 36 in the longitudinal direction of the rear cushion 36 as the extension line of the rear cushion 36 in the axial direction L1 (hereinafter, called, on the extension line of the rear cushion in the longitudinal direction). The left pivot plate 13L is formed with the opening 38 penetrating through the horizontal direction, and in the side view, the rear cushion supporting portion 37 is positioned inside of the opening 38.

That is, in the side view, since the rear cushion supporting portion 37 is positioned inside of the opening 38, the rear cushion supporting portion 37 is exposed to the left side through the opening 38.

With this arrangement, in the motorcycle 1, when a user inserts or removes the tool into or from the opening 38 and performs operation with respect to the rear cushion supporting portion 37, the rear cushion 36 can be attached or detached. An arrow α in FIG. 5 represents an insertion direction of the tool passed through the opening 38.

A state illustrated in FIG. 6 shows a state of the swing arm when the motorcycle 1 is immobilized; however, in certain embodiments, a state where the center upper cross frame 21 is positioned on the extension line of the rear cushion 36 in the longitudinal direction is satisfied when at least the motorcycle 1 is immobilized. However, it is preferable that the state where the center upper cross frame 21 is positioned on the extension line of the rear cushion 36 in the longitudinal direction is satisfied during a period from a fully deflected state of the rear cushion 36 (a state where the maximum load is input) to a fully stretched state of the rear cushion 36. Further, it is preferable that the extension line of the rear cushion 36 in the longitudinal direction intersects with the center of a cross-sectional surface of the center upper cross frame 21, and an intersecting state is satisfied during the period from the fully deflected state of the rear cushion 36 (the state where the maximum load is input) to the fully stretched state of the rear cushion 36.

On the other hand, in certain embodiments, in the side view, the main frames 12L, 12R, the seat frames 14L, 14R, and the pivot plates 13L, 13R form the Y shape. The opening 38 is formed in substantially the center in the longitudinal direction of the connection portion C of the Y shape shown by a two-dot chain line in the drawing and above the pivot shaft 4A.

Figure 8:
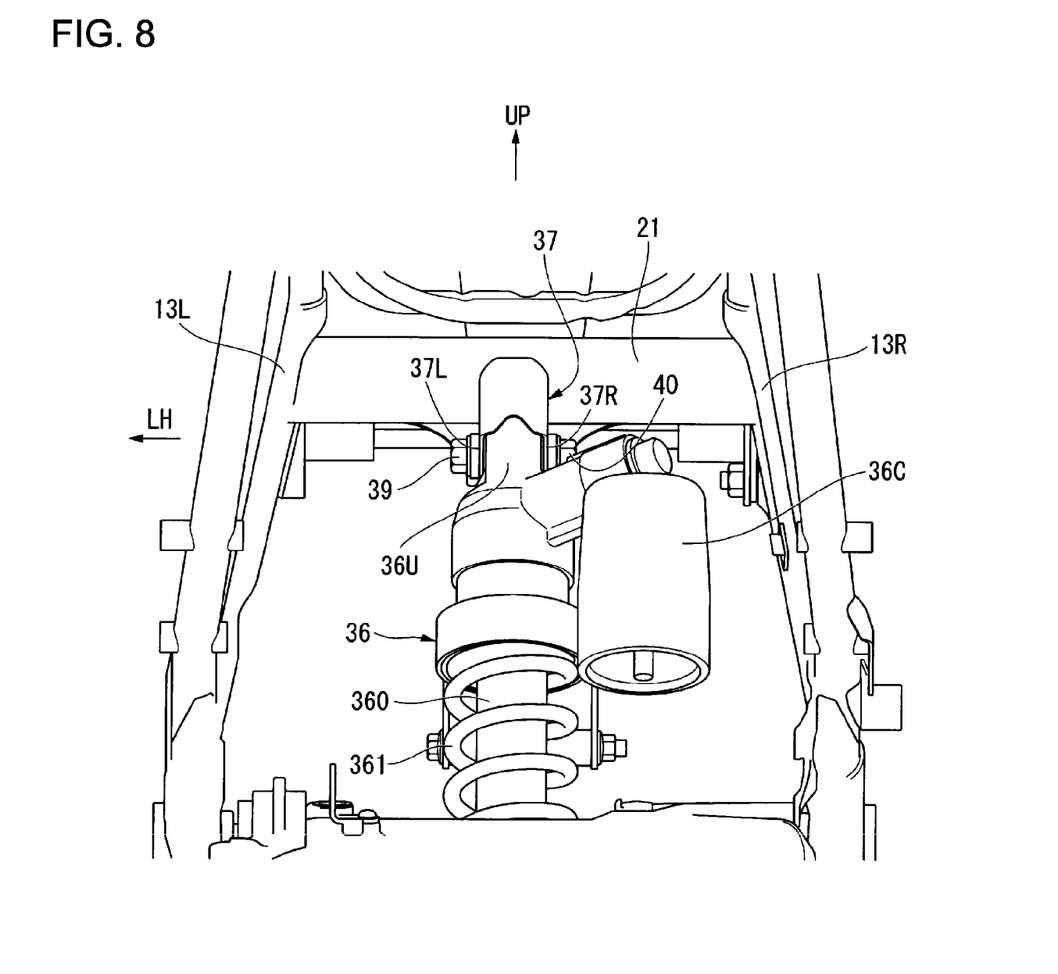
FIG. 8 is a rear view around a rear cushion supporting portion for connecting a center upper cross frame of the vehicle body frame and a rear cushion.

With reference to FIG. 8, the rear cushion supporting portion 37 will be described in detail. The rear cushion supporting portion 37 has a pair of left and right wall portions 37L, 37R that are welded to an outer peripheral surface of the center upper cross frame 21 and that extend downward, and a space between the left and right wall portions 37L, 37R is opened downward and in the longitudinal direction. The rear cushion supporting portion 37 supports the upper end connection 36U of the rear cushion 36 by receiving the upper end connection 36U of the rear cushion 36 from below between the left and right wall portions 37L, 37R. Specifically, in the rear cushion supporting portion 37, a bolt 39 as a shaft portion is laid between the left and right wall portions 37L, 37R, and also the bolt 39 is inserted into a hole formed in the upper end connection 36U. Thereby, the upper end connection 36U of the rear cushion 36 is swingably supported in the vertical direction. A weld nut 40 for fastening a tip end of the bolt 39 is provided on an outer surface (a surface direction outward in the vehicle width direction) of the right wall portion 37R.

Also, with reference to FIG. 6, with the rear cushion 36 installed in the vehicle, in the side view, the reservoir tank 36C is positioned at a position behind the pivot plates 13L, 13R and in a space between the seat frames 14L, 14R and the sub-frames 15L, 15R. Specifically, in the motorcycle 1, in the side view, the pivot plates 13L, 13R, the seat frames 14L, 14R, the sub-frames 15L, 15R, and the front truss frames 24FL, 24FR form a rectangular space, and the reservoir tank 36C is positioned in the rectangular space. Thereby, in the motorcycle 1, maintenance work on the reservoir tank 36C is easily performed through the space.

Also, with reference to FIGS. 3 and 6, in certain embodiments, the rear cushion supporting portion 37 is positioned substantially at the same height as the engine supporting portions 18L, 18R.

In the motorcycle 1 according to the above-described embodiments, since the center upper cross frame 21 is positioned on the extension line of the rear cushion 36 in the longitudinal direction, the load transmitted from the rear cushion 36 can be ideally received by the center upper cross frame 21. Also, the relief portion for the tool for the operation with respect to the rear cushion supporting portion 37 is ensured by the opening 38 formed in the left pivot plate 13L of the pivot plates 13L, 13R. Further, in order to ensure the relief portion for the tool, it is not necessary to displace or the like the rear cushion supporting portion 37 from the pivot plates 13L, 13R. Thereby, the area for the pivot plates 13L, 13R can be easily ensured, and the rigidity of the pivot plates can be easily ensured.

Also, in the motorcycle 1, in the side view, the center upper cross frame 21 completely overlaps with the left and right pivot plates 13L, 13R. Also, the rear cushion supporting portion 37 has the pair of left and right wall portions 37L, 37R that extend downward from the center upper cross frame 21, and supports the upper end connection 36U of the rear cushion 36 by receiving the upper end connection 36U of the rear cushion 36 from below between the left and right wall portions 37L, 37R, the upper end connection 36U corresponding to the other end of the rear cushion 36 in the longitudinal direction.

With this structure, in the motorcycle 1, in the side view, the center upper cross frame 21 is completely hidden by the pivot plates 13L, 13R, and the appearance quality is improved. Also, the rear cushion supporting portion 37 has the pair of left and right wall portions 37L, 37R, and supports the upper end connection 36U of the rear cushion 36 by receiving the upper end connection 36U of the rear cushion 36 from below between the wall portions 37L, 37R. Thereby, the rear cushion 36 can be preferably swingable in the longitudinal direction and the vertical direction with the horizontal direction as the shaft center.

Also, in the motorcycle 1, in the side view, the reservoir tank 36C for the rear cushion 36 is configured to be positioned behind the pivot plates 13L, 13R and between the seat frames 14L, 14R and the sub-frames 15L, 15R.

With this structure, in the motorcycle 1, the adjustment work or the like with respect to the reservoir tank 36C can be easily performed. Also, air or wind is easily led to flow toward the reservoir tank 36C from the opening 38 formed in the pivot plate 13L or a portion between the seat frames 14L, 14R and the sub-frames 15L, 15R. Therefore, the reservoir tank 36C can be preferably cooled.

Also, in the motorcycle 1, in the side view, the main frames 12L, 12R, the seat frames 14L, 14R, and the pivot plates 13L, 13R form the Y shape, and the opening 38 is formed in substantially the center in the longitudinal direction of the connection portion of the Y shape and above the pivot shaft 4A.

With this structure, since the opening 38 is formed in a part with no load comparatively applied in the pivot plate 13L, the reduction in the rigidity of the pivot plate 13L due to the formation of the opening 38 can be suppressed.

Also, in the motorcycle 1, the lower end of the rear cushion 36 (the lower end of the rod portion 36B) is connected to the swing arm 4 through the link member 31, and the link member 31 is arranged to straddle the swing arm 4 and the part lower than the position with the pivot shaft 4A set in the pivot plate 13L.

With this structure, in the motorcycle 1, since the link member 31 is arranged in a comparatively lower position, length of the rear cushion 36 is ensured, and a damping effect is improved.

Also, in the motorcycle 1, the engine E is disposed in front of the rear cushion supporting portion 37, the engine E is supported by the engine supporting portions 18L, 18R provided to the pivot plates 13L, 13R, and the rear cushion supporting portion 37 is positioned substantially at the same height as the engine supporting portions 18L, 18R. With this structure, in the motorcycle 1, the complicated application of the load on the pivot plates 13L, 13R can be suppressed.

Certain embodiments of the present invention have been described. The present invention is not limited to the above-described embodiments, and various design modifications may be made within the scope not departing from the gist of the present invention.

Figure 9:
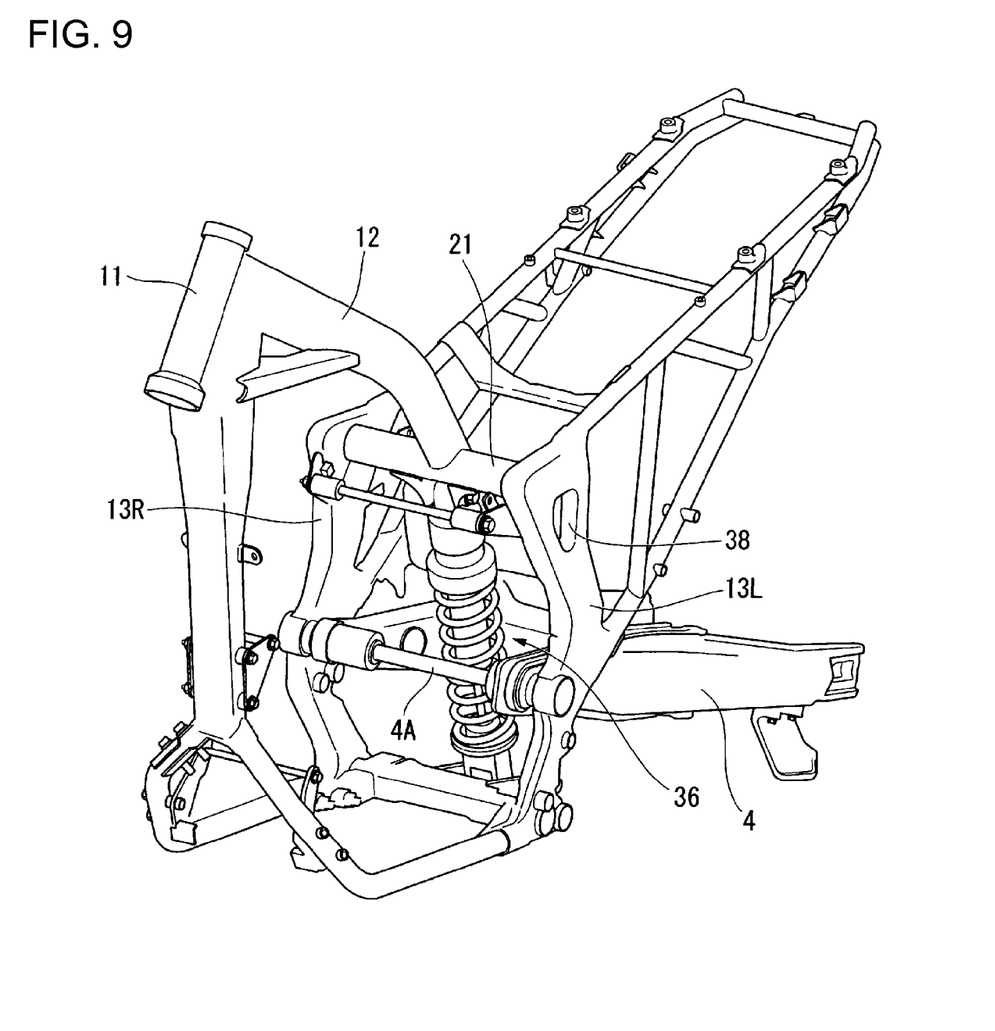
FIG. 9 is a perspective view of a vehicle body frame according to an alternative of the embodiment.

For example, in the above-described embodiments, such a structure that the main frame includes the pair of left and right main frames 12L, 12R has been described; however, as shown in FIG. 9, one main frame 12 may be extended from the head pipe 11. In the alternative in FIG. 9, the same reference sign is used to represent the same structure as that in certain embodiments. In the alternative, the center upper cross frame 21 is connected to the rear end of the main frame 12 and extends in the horizontal direction, and the left and right ends of the center upper cross frame 21 are respectively connected to the left and right pivot plates 13L, 13R.

Also, as described in the alternative, when such a structure that the one main frame 12 extends from the head pipe 11 is employed, such a structure that the pivot plates 13L, 13R are directly connected to the rear end of the main frame 12 may be employed.

Also, as other alternatives, in the above-described embodiments, although such an example that the opening 38 is formed in the left pivot plate 13L has been described, the opening may be formed also in the right pivot plate 13R. Also, in the above-described embodiments, although such a structure that the lower end of the rear cushion 36 is connected to the swing arm 4 through the link member 31 has been described, such a structure that the lower end of the rear cushion 36 is directly connected to the swing arm 4 may be employed.

Also, in the above-described embodiments, although the present invention is applied to the motorcycle as the saddle-ride type vehicle, a concept of the saddle-ride type vehicle according to the present invention includes all the vehicles with riders riding astride the vehicle bodies, and includes not only the motorcycles but also three- or four-wheeled vehicles. For this reason, the present invention can be applied not only to the motorcycles but also to the three- or four-wheeled vehicles.

REFERENCE SIGNS LIST

1 . . . Motorcycle (saddle-ride type vehicle)
4 . . . Swing arm
4A . . . Pivot shaft
11 . . . Head pipe
12L, 12R, 12 . . . Main frame
13L, 13R . . . Pivot plate
14L, 14R . . . Seat frame
15L, 15R . . . Sub-frame
18L, 18R . . . Rear engine supporting portion (engine supporting portion)
21 . . . Center upper cross frame
31 . . . Link member
36 . . . Rear cushion
36C . . . Reservoir tank
37 . . . Rear cushion supporting portion
37L, 37R . . . Wall portion
38 . . . Opening
E . . . Engine

We claim:
1. A saddle-ride type vehicle, comprising:
a main frame extending rearward and downward from a head pipe;
a pair of left and right pivot plates, each of the pivot plates connected to a rear end of the main frame or disposed on a side of the rear end of the main frame;
a cross frame configured to straddle the left and right pivot plates or that is connected to the rear end of the main frame and extends in a horizontal direction;
a swing arm that is swingably supported by the pivot plates;
a rear cushion that extends upward while one end thereof, in a longitudinal direction, is connected to the swing arm and configured to elongate and contract in the longitudinal direction according to swinging of the swing arm to generate damping force with respect to the swinging of the swing arm; and
a rear cushion supporting portion that is connected to the cross frame and that supports another end of the rear cushion in the longitudinal direction,
wherein the cross frame is disposed on an extension line of the rear cushion in the longitudinal direction,
wherein at least one of the left and right pivot plates defines an opening that penetrates through a horizontal direction, and
wherein in a side view, the rear cushion supporting portion can be seen inside of the opening.
2. The saddle-ride type vehicle according to claim 1,
wherein in the side view, the cross frame completely overlaps with at least one of the main frame and the pivot plates, and
wherein the rear cushion supporting portion has a pair of left and right wall portions that extend downward from the cross frame, and supports the other end of the rear cushion in the longitudinal direction in such a manner that the other end is received from below between the left and right wall portions.
3. The saddle-ride type vehicle according to claim 1, further comprising:
a pair of left and right seat frames that are disposed on respective upper sides of the left and right pivot plates and that extend rearward and upward; and
a pair of left and right sub-frames that are respectively connected to the left and right pivot plates below the left and right seat frames, that extend rearward and upward, and that have rear ends connected to the corresponding left and right seat frames,
wherein in the side view, a reservoir tank for the rear cushion is disposed rearward of the pivot plates and between the seat frames and the sub-frames.
4. The saddle-ride type vehicle according to claim 3,
wherein in the side view, the main frame, the seat frames and the pivot plates form a Y shape, and wherein the opening is formed in substantially the center in the longitudinal direction of a connection portion of the Y shape and above a pivot shaft that connects the swing arm and the pivot plates.

5. The saddle-ride type vehicle according to claim 1, wherein the one end of the rear cushion in the longitudinal direction is connected to the swing arm through a link member, and
wherein the link member is configured to straddle the swing arm and a portion below a position where a pivot shaft is placed, the pivot shaft being connected to the pivot plates and the swing arm.

6. The saddle-ride type vehicle according to claim 1, wherein an engine is disposed forward of the rear cushion supporting portion,
wherein the engine is supported by an engine supporting portion provided to each of the pivot plates, and
wherein the rear cushion supporting portion is disposed substantially at the same height as the engine supporting portion.

7. A saddle-ride type vehicle, comprising:
main frame means for forming a structural framework of the saddle-ride type vehicle, the main frame means extending rearward and downward from a head pipe;
left and right pivot plate means for forming additional portions of the structural framework of the saddle-ride type vehicle, each of the pivot plate means connected to a rear end of the main frame means or disposed on a side of the rear end of the main frame means;
cross frame means for straddling the left and right pivot plates or that is connected to the rear end of the main frame means and extends in a horizontal direction;
swing arm means for supporting an axle of a rear wheel, the swing arm means swingably supported by the pivot plates;
rear cushion means for generating damping force with respect to the swinging of the swing arm, the rear cushion means extending upward while one end thereof, in a longitudinal direction, is connected to the swing arm and configured to elongate and contract in the longitudinal direction according to swinging of the swing arm; and
rear cushion supporting portion means for supporting another end of the rear cushion in the longitudinal direction, the rear cushion supporting portion means connected to the cross frame,
wherein the cross frame means is disposed on an extension line of the rear cushion in the longitudinal direction,
wherein at least one of the left and right pivot plate means define an opening that penetrates through a horizontal direction, and
wherein in a side view, the rear cushion supporting portion means can be seen inside of the opening.

8. The saddle-ride type vehicle according to claim 7, wherein in the side view, the cross frame means completely overlaps with at least one of the main frame means and the pivot plate means, and
wherein the rear cushion supporting portion means has a pair of left and right wall portions that extend downward from the cross frame means, and supports the other end of the rear cushion means in the longitudinal direction in such a manner that the other end is received from below between the left and right wall portions.

9. The saddle-ride type vehicle according to claim 7, further comprising:
left and right seat frame means for supporting an occupant seat, the left and right seat frame means are disposed on respective upper sides of the left and right pivot plate means and extend rearward and upward; and
left and right sub-frame means for providing additional structural support to the left and right seat frame means, the left and right sub-frame means are respectively connected to the left and right pivot plates below the left and right seat frames, that extend rearward and upward, and that have rear ends connected to the corresponding left and right seat frame means,
wherein in the side view, a reservoir tank for the rear cushion means is disposed rearward of the pivot plate means and between the seat frame means and the sub-frame means.

10. The saddle-ride type vehicle according to claim 9, wherein in the side view, the main frame means, the seat frame means and the pivot plate means form a Y shape, and
wherein the opening is formed in substantially the center in the longitudinal direction of a connection portion of the Y shape and above a pivot shaft that connects the swing arm means and the pivot plate means.

11. The saddle-ride type vehicle according to claim 7, wherein the one end of the rear cushion means in the longitudinal direction is connected to the swing arm means through a link member, and
wherein the link member is configured to straddle the swing arm means and a portion below a position where a pivot shaft is placed, the pivot shaft being connected to the pivot plate means and the swing arm means.

12. The saddle-ride type vehicle according to claim 7, wherein an engine is disposed forward of the rear cushion supporting portion means,
wherein the engine is supported by an engine supporting portion provided to each of the pivot plate means, and
wherein the rear cushion supporting portion means is disposed substantially at the same height as the engine supporting portion.

* * * * *